United States Patent [19]

Scholz

[11] Patent Number: 4,773,084
[45] Date of Patent: Sep. 20, 1988

[54] SYNCHRONIZING PATTERN

[75] Inventor: Werner Scholz, Gehrden, Fed. Rep. of Germany

[73] Assignee: Telefunken Fernseh und Rundfunk GmbH, Hanover, Fed. Rep. of Germany

[21] Appl. No.: 830,689

[22] Filed: Feb. 18, 1986

Related U.S. Application Data

[63] Continuation-in-part of Ser. No. 644,581, Aug. 24, 1984, abandoned.

[30] Foreign Application Priority Data

Aug. 30, 1983 [DE] Fed. Rep. of Germany ....... 3331205

[51] Int. Cl.⁴ .............................................. H04L 7/04
[52] U.S. Cl. ..................................... 375/111; 375/67; 370/101
[58] Field of Search .................. 375/110, 111, 87, 112, 375/114, 67, 20, 55; 370/101, 102; 371/47

[56] References Cited

U.S. PATENT DOCUMENTS

| 3,631,463 | 12/1971 | Murphy ................................. 375/20 |
| 3,898,388 | 8/1975 | Goodwin . | |
| 3,903,504 | 9/1975 | Rogers et al. ......................... 375/20 |
| 4,025,720 | 5/1977 | Pachynski, Jr. ....................... 375/112 |
| 4,063,291 | 12/1977 | Gennetten . | |
| 4,124,778 | 11/1978 | Amass .................................. 375/114 |
| 4,232,387 | 11/1980 | Cottatelluci .......................... 371/47 |

FOREIGN PATENT DOCUMENTS 0081750 6/1983 European Pat. Off. .

OTHER PUBLICATIONS

Patent Abstracts of Japan, vol. 3, No. 82 (E-123), Jul. 14, 1979, No. 54-60814 of Nippon Denshin Denwa Kosha.
Fairchild: The Interface Handbook, 1975, pp. 4-18.

Primary Examiner—Robert L. Griffin
Assistant Examiner—Marianne Huseman
Attorney, Agent, or Firm—Spencer & Frank

[57] ABSTRACT

For the transmission of synchronizing information for a PCM signal transmitted in biphase code, a synchronizing pattern is provided which is composed of a biphase signal that has been shifted by one-half bit period relative to the data portion of the transmitted signal.

11 Claims, 3 Drawing Sheets

SYNCHRONIZING PATTERN

CROSS REFERENCE TO RELATED APPLICATION

This application is a continuation-in-part of copending U.S. patent application Ser. No. 06/644,581 filed Aug. 24, 1984, now abandoned.

BACKGROUND OF THE INVENTION

The present invention relates to a method of transmitting a pulse code modulated (PCM) signal in a biphase code including a complete sequence of level changes and a sequence of level changes containing gaps. More particularly the present invention relates to such a method utilizing a novel synchronizing pattern for the transmitted signal.

At the 12th meeting of the 8-mm Video Conference, Audio Workgroup, on Mar. 28th, 1983, in Tokyo, Japan, a biphase signal synchronizing pattern comprising two mutually inverted bits each having a length of 1.5 clock pulse periods was proposed.

By definition, the maximum ratio of level change intervals in a biphase signal is fixed at 2:1. Increasing this ratio to 3:1 has a significant influence on the biphase spectrum. To compensate for this drawback, different equalizer circuits are required as well as a broader transmission channel. The above mentioned biphase signal is described in "Fairchild: The Interface Handbook, 1975, Page 4–18".

SUMMARY OF THE INVENTION

It is an object of the present invention to provide for the transmission of PCM signals in biphase code with a biphase signal synchronizing pattern which has little influence on the biphase spectrum.

The above object is basically achieved according to the present invention in that in a method of transmitting a pulse code modulated data signal train in biphase code having a complete sequence of level changes and a sequence of level changes containing gaps, and including inserting a synchronizing pattern into the data signal train, the synchronizing pattern comprises a biphase signal of at least one bit which has been shifted by one-half bit period relative to the data signal.

The synchronizing pattern according to the present invention can be used for a biphase level signal, for a biphase mark signal or for a biphase space signal, and preferably includes two, and more preferably at least three, bits.

According to the present invention, the interval or space between level changes within the synchronizing pattern is 0.5 or 1.0 bit periods as it is in the biphase code signal. At both sides of at least one long halfwave of the synchronizing pattern, there is always an odd number of successive short halfwaves. The deviation from the biphase signal is merely that the number of the short, successive halfwaves is odd. For an uninterfered biphase signal this number must always be even.

BRIEF DESCRIPTION OF THE DRAWINGS

For a better understanding of the invention, several embodiments thereof will be described in greater detail below with the aid of drawing figures.

DETAILED DESCRIPTION OF THE PREFERRED EMBODIMENTS

Figure 1:
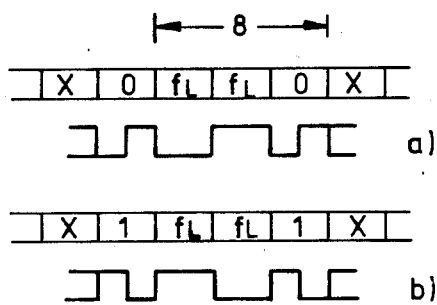
FIG. 1 shows a synchronizing pattern according to the invention for a biphase level signal.

FIG. 1 shows a synchronizing pattern 8 for a biphase level signal. In line a, one bit of the value 0 precedes the synchronizing pattern 8. Synchronizing pattern 8 is shifted by one-half bit clock pulse. A level change in the middle of a bit cell, i.e., during a bit clock pulse, is thus no longer present. A decoder circuit designed for a biphase level signal detects this bit sequence as a nonbiphase level signal. In the embodiment illustrated in FIG. 1, synchronizing pattern 8 is composed of three bits. The first two bits $f_L f_L$ are inverted with respect to one another and each has a length of one bit clock pulse. The third bit of the synchronizing pattern 8 is identical with the bit immediately preceding the synchronizing pattern 8, i.e., a zero in line a and a one in line b. To enable the same oscillation train (1a or 1b) to always be generated as the synchronizing pattern, a zero or a one preceding the synchronizing pattern 8 may be provided as part of the actual synchronizing pattern. In the case of FIG. 1, the synchronizing pattern according to the invention would then consist of four bits.

Figure 2:
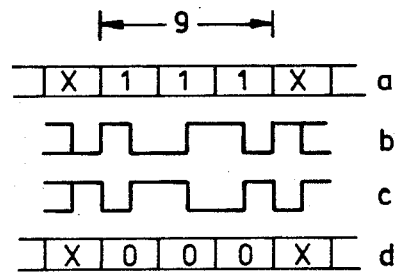
FIG. 2 shows a synchronizing pattern according to the invention for a biphase mark or biphase space signal, respectively.

FIG. 2 shows a synchronizing pattern 9 for a biphase mark or biphase space signal. The bit preceding synchronizing pattern 9 is here not decisive for the course of the synchronizing pattern; instead it is the direction of the level change between the last data bit x and the first bit of the synchronizing pattern 9. Depending on the direction of this level change, the pattern shown in line b or the one in line c is produced. By placing an additional bit ahead of the actual synchronizing pattern, it is possible here as well to produce a defined sequence for the synchronizing pattern. This additional bit must always be selected in such a manner that the level change determinative for the sequence of the synchronizing pattern 9 has the desired direction. Demodulation of line b or c, respectively, according to biphase mark would produce the bit pattern shown in line a, while demodulation of line b or c according to biphase space would produce the bit pattern shown in line d.

Figure 3:
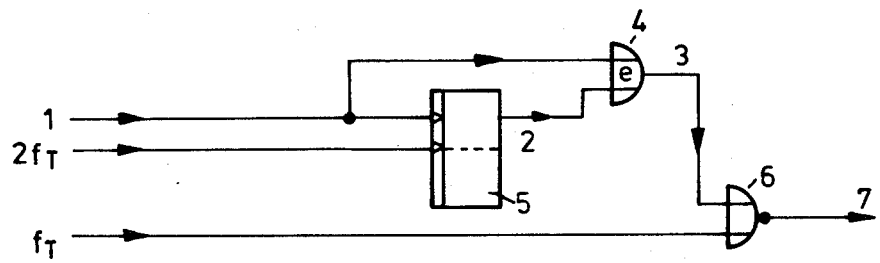
FIG. 3 shows a circuit for generating a block synchronizing signal from a signal including a synchronizing signal according to the invention.

FIG. 3 shows a circuit for generating a block synchronizing signal from a signal train including a synchronizing pattern according to the invention. The circuit includes an input 1 to which is fed any desired biphase signal. Input 1 leads to one input of an exclusive-OR gate 4 and to the signal input of a D-flip-flop 5. As shown, flip-flop 5 is clocked via its clock input at $2f_T$, i.e., twice the clock pulse frequence $f_T$. Output 2 of D-flip-flop 5, at which appears a biphase signal which is shifted in phase by one-half bit period with respect to the biphase signal at input 1, is connected to the other input of exclusive-OR gate 4. Output 3 of exclusive-OR gate 4 is connected with one input of a NOR gate 6. The other input of NOR gate 6 receives the bit clock pulse signal $f_T$. At the output 7 of NOR gate 6, a block synchronizing signal can be obtained.

Figure 4:
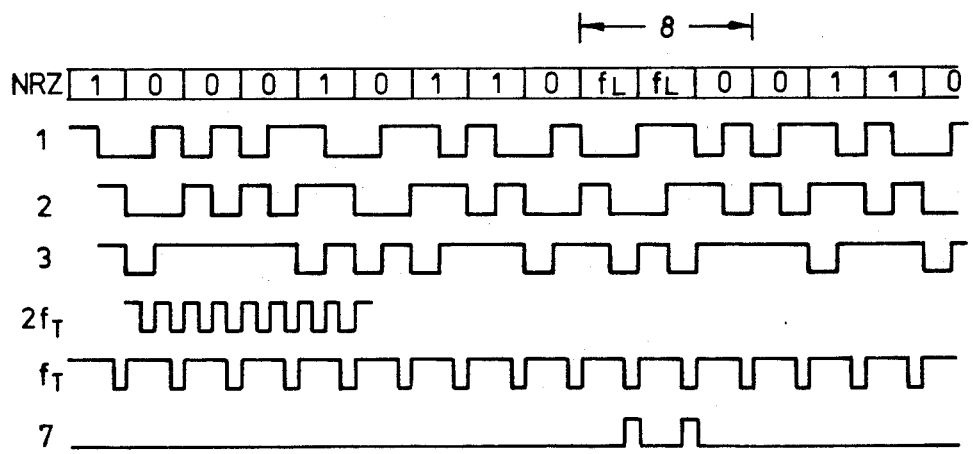
FIG. 4 shows the pulse diagram for the circuit of FIG. 3.

FIG. 4 shows a pulse diagram to illustrate the operation of the circuit of FIG. 3. The first line shows the NRZ (non-return to zero) signal for the biphase signal at input 1 for the case where the biphase input signal is a biphase level signal (FIG. 1a). As shown, synchronizing pattern 8 is composed of three bits, $f_L$, $f_L$ and 0. The identifications of the signal sequences in FIG. 4 correspond to those of FIG. 3, where 1 is the biphase signal at input 1, 2 is the biphase signal at output 2 of flip-flop 5, 3 is the output signal of the exclusive-OR gate 4, and 7 is the resulting synchronizing signal. As can clearly be seen from line 7, an output signal, i.e., a synchronizing signal, exists only in the section of synchronizing pattern 8.

Figure 5:
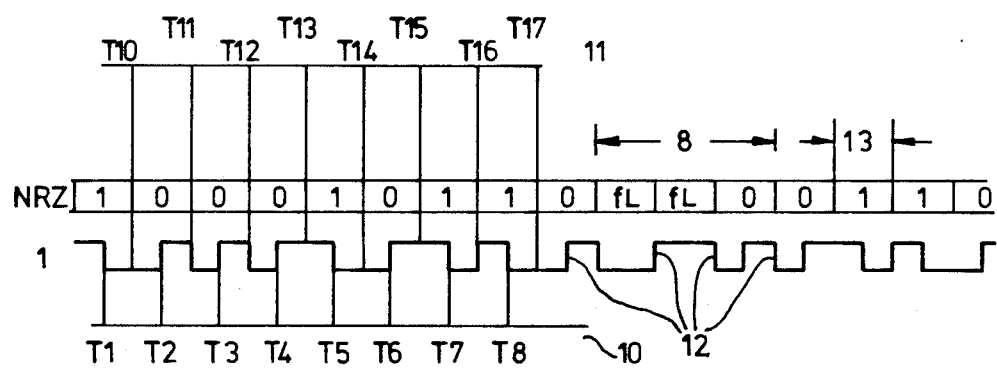
FIG. 5 shows the first two signal lines of FIG. 4 and is used to explain the biphase signal.

FIG. 5 shows that, in principle, each biphase signal has two sequences 10, 11 of level changes 12 which occur at the spacing of one bit period 13 or a whole number multiple thereof i.e., nT. The first sequence 10 is complete, i.e., sequence 10 has a level change 12 at every point in time T1, T2, T3, ... T8, which occur at the spacing of one bit period 13. The second sequence 11 occurring at times T10–T17, has gaps in it, i e., sequence 11 has no level changes at times T10, T13, T14, T15 and T17, and has level changes 12 only at T11, T12 and T16. In biphase level, the complete sequence contains the information and the sequence with gaps, i.e., the incomplete sequence, is produced as required. In biphase mark or biphase space, however, the sequence with the gaps carries the information. The direction of the level changes in the complete sequence is thus a result of requirements to provide the necessary coding.

A biphase signal synchronizing pattern according to the invention containing halfwaves and being shifted by one-half bit period produces as many gaps in the complete level change sequence as there are long halfwaves. With a circuit according to FIG. 3, these gaps and thus the position of the synchronizing signal according to the invention can be detected. The minimum length for the synchronizing signal is preferably two bits: one bit for producing a gap and one bit for insertion into the given signal so that no halfwaves of undue length are produced. If the synchronizing signal is always to have the same sequence, then as indicated above, it is necessary to insert two additional bits.

Since synchronizing signals can be simulated by interference, the use of longer synchronizing signals may be advisable which then produce several gaps in the complete sequence of level changes. Accordingly, the synchronizing signals according to the previously illustrated and disclosed embodiments of the invention each includes two long halfwaves and each produces two gaps in the complete sequence of level changes of the total or transmitted signal.

Figure 6:
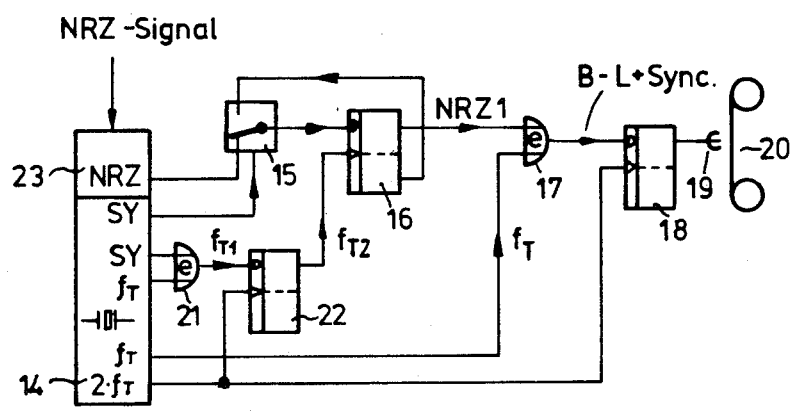
FIG. 6 is a block circuit diagram of one embodiment of a modulator circuit used to insert a synchronizing signal according to the invention into a biphase code data stream.

Referring now to FIG. 6 there is shown a modulator circuit for inserting a synchronizing signal or word according to the invention, and which produces more than two gaps, into a stream of NRZ data. As shown, the NRZ data signal, which is to be modulated to a biphase-level (B-L) signal in the illustrated example, is fed to a buffer 23 provided in a clock pulse generator 14. The clock pulse generator 14 receives its basic clock pulse from the NRZ signal and, in a known manner, calculates, on the basis of the synchronizing word, clock pulse signals fT, 2fT and SY (see first three lines of FIG. 7), with clock pulse frequency fT being the frequency sum of the frequencies of the NRZ signal and the clock pulse steps of the synchronizing word. From the buffer 23, the NRZ signal is fed via a switch 15, which is controlled by the synchronizing clock pulse signal SY, to the input of a delay flip-flop (DFF) 16 which is controlled or clocked by a clock pulse signal $fT_2$ (see line (e) of FIG. 7) and whose complimentary output is connected to the alternate position of the switch 15. The normal output of the delay flip-flop 16, i.e., the NRZ1 signal as indicated, is fed to one input of an exclusive OR-gate 17 to whose other input is fed the clock pulse signal fT. The output signal of the exclusive OR-gate 17, which is a biphase level (B-L) plus synchronizing signal, is in turn fed to the input of a further delay flip-flop 18 which is clocked by the clock pulse signal 2fT. In FIG. 6, the output signal from flip-flop 18 is fed or transmitted to a magnetic head 19 which records the signal on a passing magnetic tape 20. Of course, if desired, the output signal from flip-flop 18 can be transmitted in any known manner.

Figure 7:
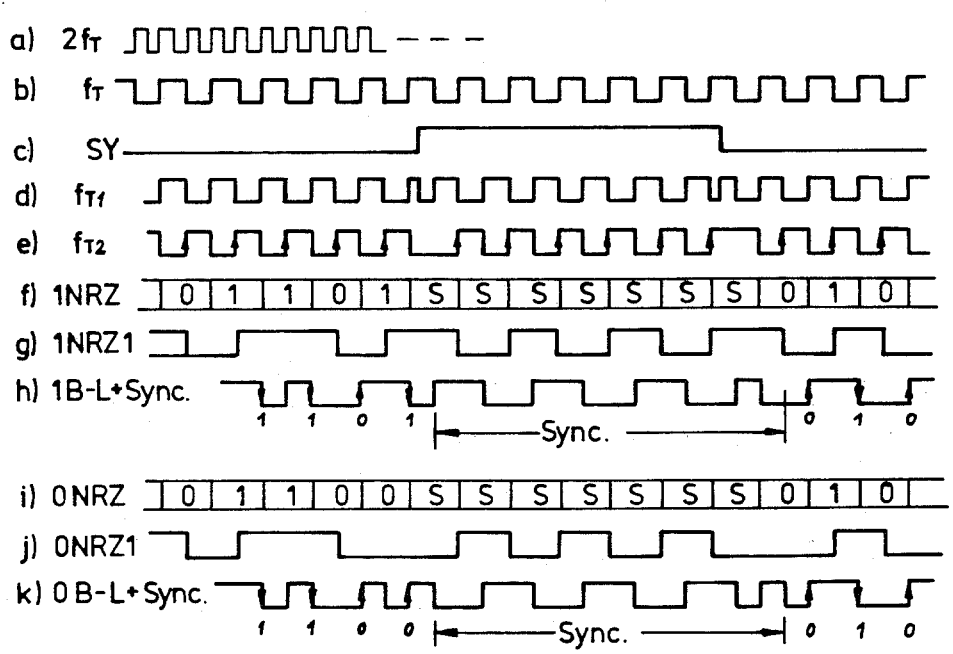
FIG. 7 shows the time sequence of the signals in the circuit of FIG. 6.

In order to produce the clock pulse signal $fT_2$ (line (e) of FIG. 7) for the flip-flop 16, the clock pulse signal fT and the synchronizing clock pulse SY are fed to the respective inputs of a further exclusive OR-gate 21 to produce an output signal $fT_1$ (line (d) of FIG. 7) which is fed to the input of a further delay flip-flop 22. This flip-flop 22 is in turn controlled or clocked by the clock pulse signal 2fT to produce the signal $fT_2$.

With the circuit of FIG. 6, the insertion of a biphase signal shifted by one-half bit is effected during the synchronizing clock pulse SY. While synchronizing bits are being transmitted, information bits are intermediately stored in the buffer 23.

Turning now to FIG. 7, there is shown the time sequence of the various signals produced in the circuit of FIG. 6 for a biphase level signal. Lines (a)–(e) show the various clock pulse signals generated in the circuit of FIG. 6 as described above. In order to indicate the biphase level signal mode of operation for the circuit of FIG. 6 when the synchronizing word SYNC is preceded by a "1" or by a "0" in the NRZ data signal, two illustrative NRZ signals are shown in lines (f) and (i) of FIG. 7. In the NRZ signal (1NRZ) of line (f), the bit preceding the synchronizing word, which is indicated by the bits marked S during which no information is transmitted, is a "1", whereas in the NRZ signal (ONRZ) of line (i) the bit preceding the synchronizing word is a "0". The respective signals appearing at the outputs of flip-flop 16 and gate 17 are shown in lines (g) and (h) of FIG. 7 for the 1NRZ signal of line (f), and in lines (j) and (k) of FIG. 7 for the ONRZ signal of line (i).

It will be understood from the above description that the present invention is susceptible to various modifications, changes and adaptations which are intended to be comprehended within the meaning and range of equivalents of the invention within the bounds of the appended claims.

What is claimed is:

1. In a method of transmitting a pulse code modulated data signal train in biphase code having a complete sequence of level changes and a sequence of level changes having gaps, and including periodically inserting a synchronizing pattern into the data signal train prior to transmission; the improvement wherein said step of inserting includes inserting a synchronizing pattern which comprises a biphase signal which is shifted by one-half bit period relative to said data signal.

2. A method as defined in claim 1, wherein said shifted biphase signal of said synchronizing pattern produces at least one gap in the complete level change sequence of the transmitted biphase signal while producing no spacings between adjacent level changes other than one-half or one bit period in the total transmitted signal.

3. A method as defined in claim 2, wherein said biphase code is a biphase level code; and said synchronizing pattern includes a plurality of bits with the last bit being identical with the bit immediately preceding said synchronizing pattern.

4. A method as defined in claim 3 wherein said shifted biphase signal of said synchronizing pattern produces a plurality of gaps in said complete level change sequence of said transmitted biphase signal.

5. A method as defined in claim 1 wherein said synchronizing pattern is composed of at least two bits.

6. A method as defined in claim 1 wherein said synchronizing pattern is composed of at least three bits and always has the same signal sequence.

7. A method as defined in claim 1 wherein said data signal train is a biphase level signal and said synchronizing pattern is composed of three bits.

8. A method as defined in claim 1 wherein said synchronizing pattern includes at least two sequential bits, each having a length of one bit period, which are inverted with respect to one another.

9. A method as defined in claim 8 wherein: said biphase signal of said data signal train is a biphase level signal; said synchronizing pattern includes a further bit following said at least two bits; and said further bit is identical with the bit of the transmitted signal immediately preceding said at least two bits of said synchronizing pattern.

10. A method as defined in claim 1 wherein: said biphase code is a biphase level code; and said synchronizing pattern includes an even number of sequential bits, each having a length of one bit period, which are inverted with respect to one another, and a further bit immediately following said even number of bits and being identical to the bit immediately preceding said even number of bits.

11. A method as defined in claim 10 wherein said synchronizing pattern includes three bits.

* * * * *